(12) United States Patent
Borneo et al.

(10) Patent No.: US 7,395,532 B2
(45) Date of Patent: Jul. 1, 2008

(54) PROCESS FOR RUNNING PROGRAMS ON PROCESSORS AND CORRESPONDING PROCESSOR SYSTEM

(75) Inventors: Antonio Maria Borneo, Matera (IT); Fabrizio Simone Rovati, Cinisello Balsamo (IT); Danilo Pietro Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 692 days.

(21) Appl. No.: 10/612,831

(22) Filed: Jul. 1, 2003

(65) Prior Publication Data

US 2004/0054882 A1      Mar. 18, 2004

(30) Foreign Application Priority Data

Jul. 2, 2002      (EP)      .................................. 02425436

(51) Int. Cl.
*G06F 9/44* (2006.01)
*G06F 15/16* (2006.01)
*G06F 15/76* (2006.01)

(52) U.S. Cl. ......................... 717/161; 717/149; 717/155; 718/108; 712/215

(58) Field of Classification Search .................. 717/140, 717/159, 131
See application file for complete search history.

(56) References Cited

U.S. PATENT DOCUMENTS

| | | | |
|---|---|---|---|
| 5,031,096 A | | 7/1991 | Jen et al. |
| 5,129,077 A | | 7/1992 | Hillis |
| 5,634,135 A | | 5/1997 | Hollander |
| 5,787,302 A | * | 7/1998 | Hampapuram et al. ......... 712/24 |
| 5,951,674 A | * | 9/1999 | Moreno ....................... 712/210 |
| 6,044,450 A | | 3/2000 | Tsushima et al. |
| 6,272,481 B1 | | 8/2001 | Lawrence et al. |
| 6,298,370 B1 | * | 10/2001 | Tang et al. ................... 718/102 |

(Continued)

FOREIGN PATENT DOCUMENTS

EP      0 768 602 A2      4/1997

(Continued)

OTHER PUBLICATIONS

Biglari-Abhari, M. et al., "Improving Binary Compatibility in VLIW Machines Through Compiler Assisted Dynamic Rescheduling," in *Proceedings of the Euromicro Conference, Euromicro 26*, vol. 1, Los Alamitos, CA, Sep. 5-7, 2000, pp. 386-393.

*Primary Examiner*—Tuan Dam
*Assistant Examiner*—Isaac T Tecklu
(74) *Attorney, Agent, or Firm*—Lisa K. Jorgenson; Timothy L. Boller; Seed IP Law Group PLLC (57) ABSTRACT

Programs having a given instruction-set architecture are executed on a multiprocessor system comprising a plurality of processors, for example of a VLIW type, each of said processors being able to execute, at each processing cycle, a respective maximum number of instructions. The instructions are compiled as instruction words of given length executable on a first processor. At least some of the instruction words of given length are converted into modified-instruction words executable on a second processor. The operation of modifying comprises in turn at least one operation chosen in the group consisting of: splitting the instruction words into modified-instruction words; and entering no-operation instructions in the modified-instruction words.

29 Claims, 8 Drawing Sheets

U.S. PATENT DOCUMENTS

| | | | |
|---|---|---|---|
| 6,367,067 B1 * | 4/2002 | Odani et al. | 717/154 |
| 6,615,339 B1 * | 9/2003 | Ito et al. | 712/24 |
| 6,651,082 B1 | 11/2003 | Kawase et al. | |
| 6,792,560 B2 | 9/2004 | Francis et al. | |
| 6,799,266 B1 * | 9/2004 | Stotzer et al. | 712/219 |
| 6,892,293 B2 * | 5/2005 | Sachs et al. | 712/215 |
| 6,950,926 B1 | 9/2005 | Menezes | |
| 6,988,183 B1 * | 1/2006 | Wong | 712/208 |
| 7,062,634 B1 | 6/2006 | Southwell et al. | |
| 2003/0200421 A1 * | 10/2003 | Crook et al. | 712/215 |
| 2004/0039900 A1 | 2/2004 | Heishi et al. | |
| 2004/0059894 A1 | 3/2004 | Rovati et al. | |

FOREIGN PATENT DOCUMENTS

| | | |
|---|---|---|
| EP | 0 924 603 A2 | 6/1999 |
| EP | 1 102 166 A2 | 5/2001 |
| EP | 1 152 329 A1 | 11/2001 |
| EP | 1 324 191 A1 | 2/2003 |
| GB | 2332075 A | 9/1999 |
| WO | WO 00/33186 | 6/2000 |
| WO | WO 01/53933 A2 | 7/2001 |

* cited by examiner

Fig_9

Comp.VLIW 2 (I.e. 8 issues)
Comp.VLIW 1 (I.e. 4 issues)
IIU
nop

Fig_10

No end of bundle
end of bundle A
end of bundle B
end of bundle A and B stop_bundle B
stop_bundle A Fig_11

Fig_12

Fig. 13

| Process | Num. | %VLIW | Exec. time | Memory | CompiledExecution ForVLIW OfLength | OnVLIW Oflength | Memory address |
|---|---|---|---|---|---|---|---|
| SystemIdleProcess | 0 | 52 | 4:18:39 | 16K | | | |
| System | 2 | 02 | 0:00:37 | 200K | 4 | 4 | x1234123A |
| SMSS.EXE | 26 | 00 | 0:00:00 | 0K | 8 | 8 | x3E586321 |
| CSRSS.EXE | 34 | 00 | 0:00:06 | 908K | 4 | 8 | xFFC0A867 |
| WINLOGON.EXE | 40 | 00 | 0:00:01 | 32K | 8 | 4 | xAFE25432 |
| SERVICES.EXE | 43 | 00 | 0:00:01 | 1044K | 8 | 4 | xCECC4223 |

FIG. 14

PROCESS FOR RUNNING PROGRAMS ON PROCESSORS AND CORRESPONDING PROCESSOR SYSTEM

BACKGROUND OF THE INVENTION

1. Field of the Invention

The present invention relates to processors and methods for processing signals that can be implemented using said processors.

2. Description of the Related Art

In cell-phone systems of the second generation (for example GSM) or of a more advanced type (GPRS, EDGE, UMTS), the most widely used architecture consists of a system made up of two processors. The first processor, which is specialized in handling the part with the largest computational burden, typically consists of a Digital Signal Processor or DSP. The other processor, with tasks of control, synchronization and execution of high-level applications, is typically configured as a CPU.

Figure 1:
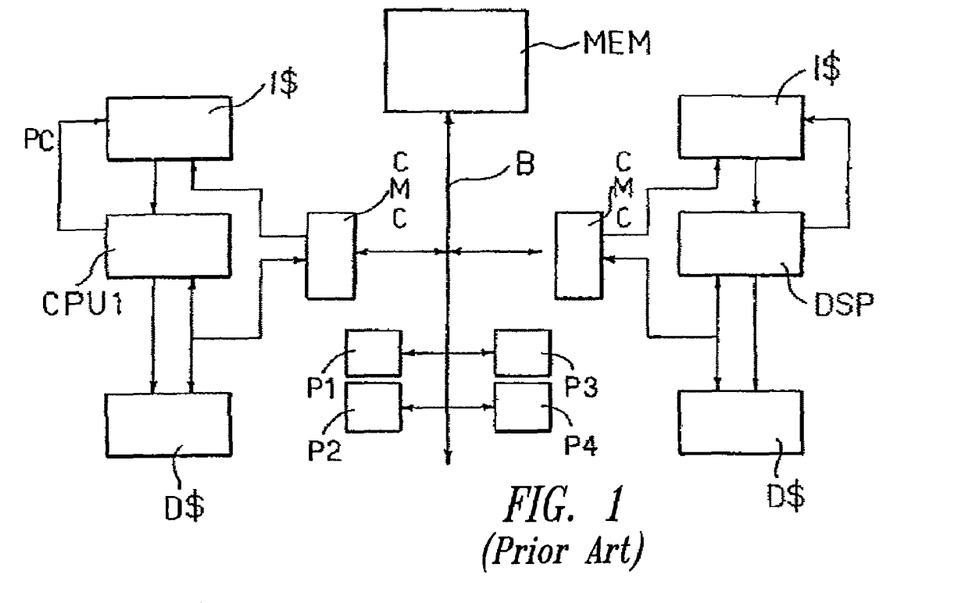

An example of architecture of this sort is illustrated in FIG. 1, where the aforesaid processors, designated respectively by DSP and CPU 1, are illustrated together with the cache memories associated thereto, namely together with instruction cache memories I$ and data cache memories D$, respectively.

Designated by CMC are the interface modules, referred to as Core Memory Controllers, which enable two sub-systems coming under the two processors DSP and CPU 1 to interface with one another by means of a main bus B with the main system memory MEM and with the various peripheral units PI, P2, P3, P4, . . . associated to the system.

The specific application in the telephony sector is, on the other hand, referred to herein purely in order to provide an example and consequently does not imply, even indirectly, any limitation of the altogether general character of the invention described in what follows. The said invention may, in fact, be applied in all those fields in which it may be useful or advantageous to employ a microprocessor.

With reference to the diagram of FIG. 1, the CPU 1 is typically a 32-bit pipelined scalar microprocessor. By "pipelined scalar" is meant that its internal architecture is made up of different logic stages, each of which contains an instruction in a very specific state. The said state may be that of:

fetching of the instruction from the memory,
decoding of the instruction,
addressing of a register file,
execution,
writing/reading of data from the memory.

The number of bits on which the CPU 1 operates is related to the width of the data on which the machine is operating. The instructions are generated and executed in turn, in a specific order defined by compiling.

The other processor, designated by DSP, is typically a superscalar microprocessor or 128-bit pipelined VLIW (acronym for Very Long Instruction Word) microprocessor.

"Pipelined superscalar" means that its internal architecture is made up of different logic stages, some of the which are able to execute instructions in parallel, for example in the execution step. Typically, the parallelism is of four instructions each (equal to 128 bit) whilst the data are expressed in 32 bits.

The processor is said to be superscalar if the instructions are re-ordered dynamically in the execution step in order to supply the execution stages which can potentially work in parallel, also altering the order generated statically by compiling of the source code, if the instructions do not present any mutual dependence. The main disadvantage of this approach lies in the complexity of the resulting machine, in which the logic of scheduling of the instructions may prove one of the most important parts in terms of number of gates.

The term VLIW processor is used if the instructions are re-ordered statically in the compiling step and executed in the pre-set order, which is not modifiable in the execution step. The advantage of the said approach is that it eliminates all the logic of management of the scheduling since this task is performed during compiling.

The main disadvantage lies in the fact that the compiled code is strictly dependent upon the implementation of the machine on which it is executed. For example, given the same instruction-set architecture (ISA), a machine with N execution units cannot execute a compiled code for a machine with K execution units if K is not equal to N. From this it follows that there is no "binary compatibility" between different generations of processors with the same ISA.

It is to be recalled that by "binary compatibility" is meant the property existing between a group of processors each of which is able to execute one and the same binary machine-code datum.

Likewise, it is not possible to create multiprocessor systems (each with a different number of execution units), which can change processes in the course of execution.

In the diagram of FIG. 1, each processor possesses its own data cache D$ and its own instruction cache I$, so as to be able to load from the main memory MEM both the data on which to operate and the instructions to be executed in parallel. Since the two processors CPU 1 and DSP are connected to the main memory MEM through the system bus B, the two processors are typically found competing for access to said memory when an instruction and/or the data on which they are to operate must be located in the main memory, the said instruction or data not being available in their own caches.

A system based upon the architecture represented in FIG. 1 has a sharing of work and of processes that is rigid and not modifiable, such as to render asymmetrical the workload and the software programs to be executed.

By way of reference, a processor such as the CPU 1 usually possesses 16 Kbytes of data cache and 16 Kbytes of instruction cache, whereas the DSP usually possesses 32 Kbytes of data cache and 32 Kbytes of instruction cache.

Figure 2:
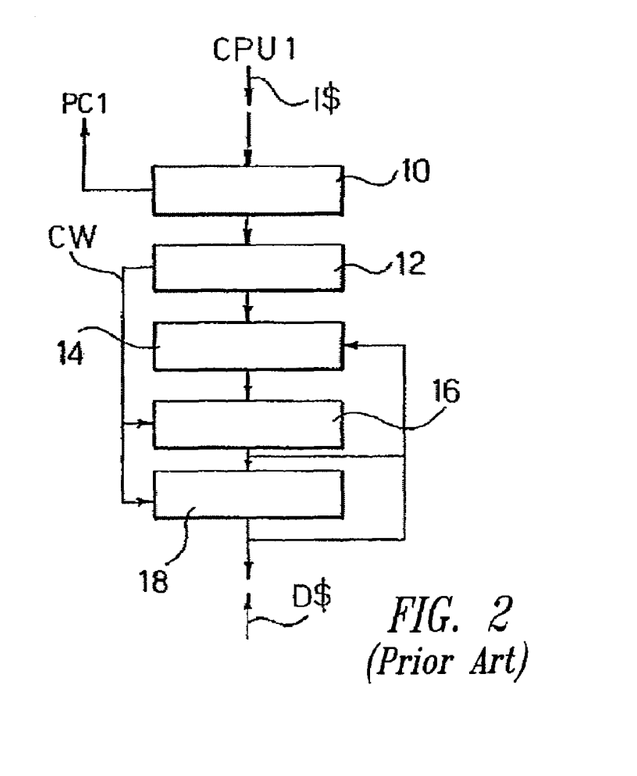

The flowchart of FIG. 2 illustrates the logic diagram of the CPU described from top to bottom. The first stage, designated by 10, generates the memory address to which the instruction to be executed is associated, the said address being referred to as program counter. The stage 10 is hence configured typically as a fetch stage, whilst the instruction thus loaded is decoded in the stage 12 separating the bit field which defines its function (for example, addition of 2 values contained in two registers located in the register file) with respect to the bit fields which address the operands. The said addresses are sent to a register file from which (in a stage designated by 14) are read the operands of the instruction. The operands and the bits which define the function to be executed are sent to the execution unit which, in a stage 16, performs the desired operation, for example the operation of addition referred to previously. The result can thus be re-stored in the register file in a stage 18 currently called write-back stage.

The process schematically represented in FIG. 2 operates in combination with a load/store unit which enables reading/writing of any possible data in memory with the aid of specific instructions dedicated to the purpose.

It may be readily appreciated that the set of instructions is in biunique correspondence with a given microprocessing CPU architecture.

Figure 3:
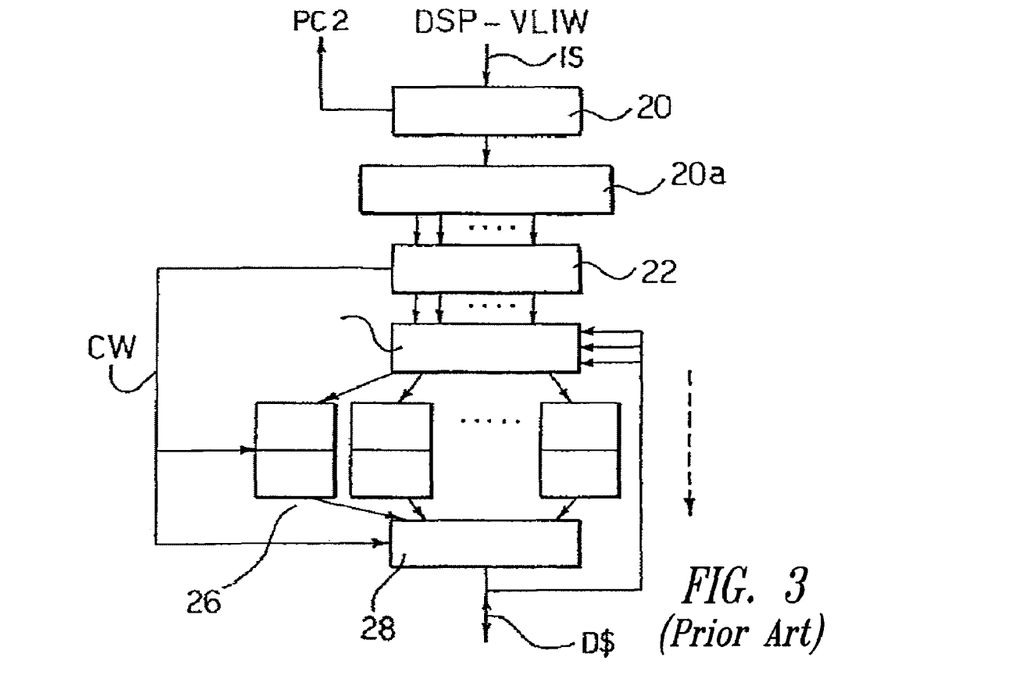

The flowchart of FIG. 3 shows, instead, the logic diagram of the DSP. Also in this case, there is envisaged an initial fetch stage 20, associated to which there is logically cascaded a stage 20a for issuing instructions. The reference number 22 designates, instead, a decoding stage whilst the reference number 24 designates a register file (see the stages 14 and 16 of FIG. 2). The reference number 28 designates a stage for re-storage in the register file, which is in general akin to the stage 18 of FIG. 1. In the diagram of FIG. 3 the reference number 26 designates collectively a plurality of execution stages that can be executed in parallel.

Both in FIG. 1 and in FIG. 3 the reference CW designates the branching lines of the control words.

It will be appreciated that the main difference between the diagram of FIG. 2 and the diagram of FIG. 3 is provided by the fact that the diagram of FIG. 3 envisages the possibility of working in parallel on different sets of instructions. Another difference lies in the fact that the diagram of FIG. 3 envisages the use of a greater number of execution units available, which can operate in parallel in a superscalar and VLIW processor. In both cases, the set of instructions is in biunique correspondence with a given microprocessing architecture.

Assuming that the two sets of instructions designed to be executed by the processors CPU 1 and DSP are different from one another (as is commonly the case with the architecture of wireless processors) it is understandable that instructions (and hence tasks to be executed), which can be executed the processor CPU 1 cannot be executed by the DSP, and vice versa.

For the above to be possible, it is necessary to compile each process for each processor, thus increasing the memory of the program. Whenever a process is to be executed by a specific processor, it is then necessary to load and execute the code of the particular task that has been compiled for that processor. There is moreover encountered the problem linked to the fact of having to correlate the different points of partial execution of the programs when they are to be shifted from one processor to another (i.e., re-map the program counters correctly) and of having to convert all the processing data from the representation system of one processor to the representation system of another (for example, the contents of the state and general-purpose registers).

The above problems are difficult to solve, so that in general a process is compiled and executed on a single processor.

Figure 4:
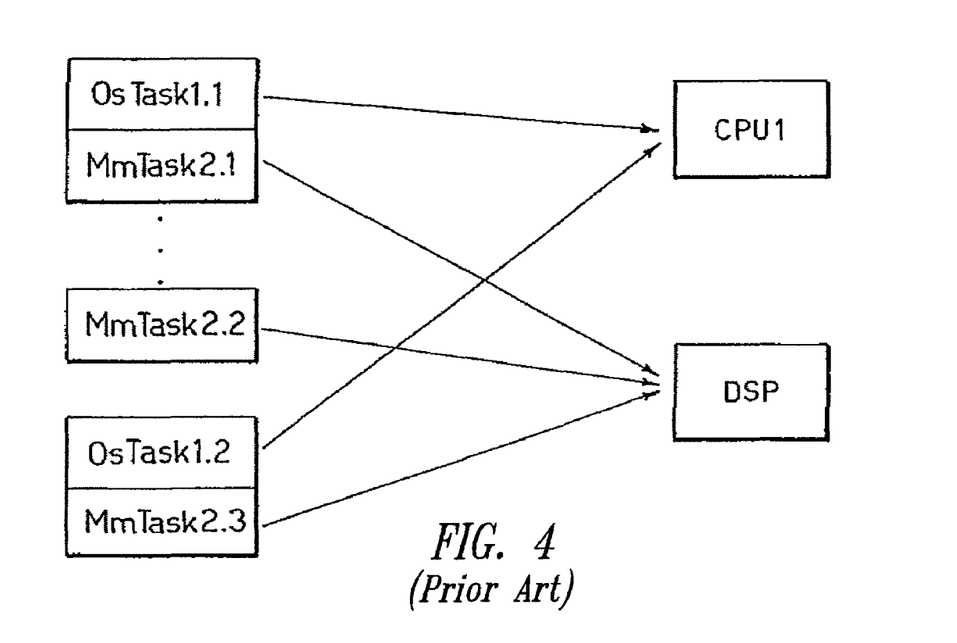
Figure 5:
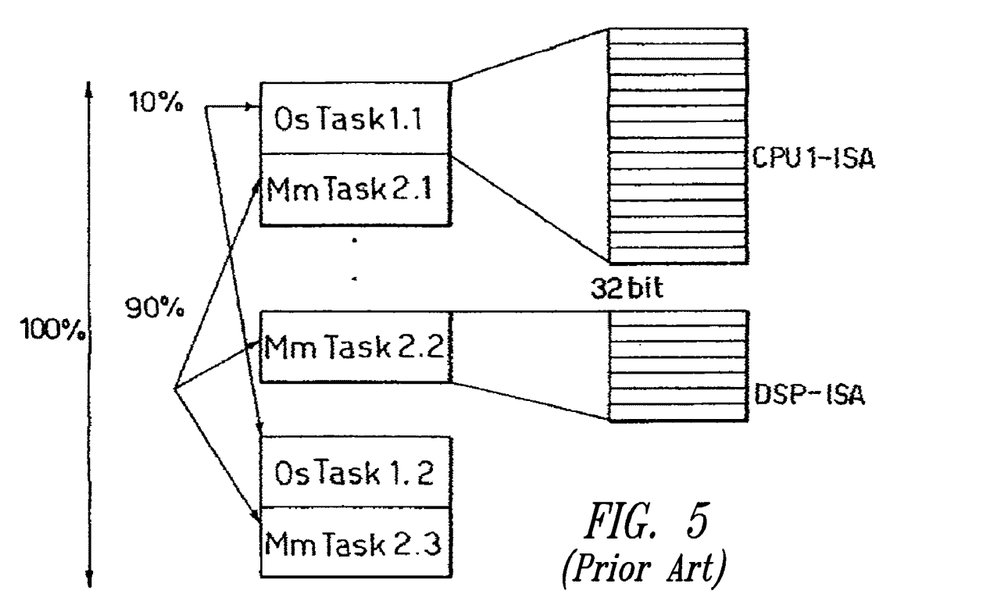

With reference to FIGS. 4 and 5, it is possible to consider a sequence of sets of instructions of said processes.

In general, two types of processes are distinguished, namely:
  those corresponding to the operating system and to applications that use calls to functions of the operating system, and
  those regarding the processing of multimedia (audio/video/graphic) contents.

Specifically, in the diagram of FIG. 4 the references OsTask 1.1, 1.2, etc. illustrate processes which can be executed by the processor CPU 1. The processes designated by MmTask2.1, MmTask2.2, MmTask2.3, identify, instead, processes compiled so as to be executed by the DSP.

Starting from the diagram of FIG. 4, which illustrates a possible assignment of the task to two processors, it is immediately possible to return to the diagram of FIG. 5, which illustrates the corresponding flow of instructions.

Setting equal to one hundred the total time of execution of the processes, it is noted that the first processes typically last 10% of the time, whilst the second occupy a much greater part, corresponding to 90%.

Again, the first processes contain instructions generated by the compiler of the processor CPU 1 and hence can be executed by the latter, but not by the DSP. For the latter processes the situation is exactly complementary, in the sense that they contain instructions generated by the compiler of the DSP and can hence be executed by the said processor, but not by the other processor CPU 1.

It is moreover to be noted that the processor CPU 1 is characterized by a compiling flow of its own, which is independent of and distinct from that of the DSP.

Given the modest workload, it may be appreciated that the processor CPU 1 could even be turned off when not in use, so enabling a considerable energy saving.

The above hypothetical solution (switching-off of the processor CPU 1 when it is not being used) comes up, however, against the fact that the corresponding switching-off or powering-down procedures introduce additional processing latencies and these are added to the value of 10% mentioned previously. The aforesaid procedures envisage in fact:
  switching off the processor CPU 1, except for the respective register file by gating the clock signal which supplies all the internal registers;
  switching off the processor CPU completely, except that power supply is maintained for the cache memories; and
  switching off the CPU as a whole, including the data and instructions caches.

However, given that the state of the individual processor must be restored when the latter is turning back on following upon one of the operations referred to previously, the latencies introduced vary from tens of microseconds to tens or hundreds of milliseconds. The above latencies prove particularly costly, both from the energy standpoint and from the computational standpoint.

Finally, the DSP is forced to work at approximately 90% of its computational capacity. This implies an evident asymmetry in the workload of the processor CPU as compared to the workload of the DSP, an asymmetry which is revealed also in the power-management algorithms, which are distinct for the two processors.

BRIEF SUMMARY OF THE INVENTION

The purpose of the present invention is to provide a solution capable of overcoming the drawbacks outlined previously.

According to the present invention, the said purpose is achieved thanks to a procedure having the characteristics referred to specifically in the claims that follow. The invention also regards the corresponding processor system, in particular multiprocessor system.

The present invention thus offers a solution, which enables:
  execution of programs indistinctly on two or more processors, for example of the VLIW type, constituting a system in dynamically variable working conditions; and
  assurance of binary compatibility between two or more processors, in particular VLIW processors having a different maximum long-instruction-word length.

The above is achieved, at the same time ensuring that in order to support the execution of the processes, the use of an asymmetrical multiprocessing architecture is not necessary.

Basically, the solution according to the invention makes it possible to provide a multiprocessing architecture comprising a plurality of processors.

In the application described in detail purely by way of example in what follows, the processors considered are all of the VLIW type. The solution according to the invention is, however, applicable, for example, to architectures comprising one or more VLIW processors in combination with at least one superscalar processor, the only important aspect being that the processors in question should have the same instruction-set architecture (ISA).

The solution according to the invention is in fact based upon the recognition of certain essential facts.

Consider, in the first place, two or more processors (for reasons of simplicity, in what follows reference will be made only to VLIW processors) having the same instruction-set architecture (ISA), this implying that on each of them a linear sequence of basic instructions can be executed. Each process/task has been compiled for a certain VLIW processor as a flow of long instructions in which the longest has a dimension corresponding to the parallelism at the instruction level for which the VLIW processor has been designed.

Each VLIW processor can execute instructions with a different maximum length; for example, the first can execute at the most four basic instructions in parallel for each clock cycle, whilst the second can use at the most eight instructions in parallel for each clock cycle.

Each processor has a unit for issuing instructions, which typically reads from the instruction cache a number of instructions equal to the number that it is able to handle in parallel. For example, if the processor is able to handle in parallel up to four instructions, the corresponding unit for issuing instructions may read simultaneously up to four instructions but not more.

It is possible to envisage for a second VLIW processor a modified-instruction unit which is able to read at input words corresponding to very long instructions originally compiled with a view to their execution on a first VLIW processor and to issue at output words corresponding to very long instructions ready to be executed on the second VLIW processor.

The above change in the length of the instructions may be carried out in run-time conditions, without any need for recompiling and duplicating the code: each instruction in the very long instruction word has in fact been scheduled by the compiler in such a way as to be independent from the others. This result is obtained in the form of a cascade of simple splitting operations and of entry of fictitious (no-operation) instructions according to the length of the instructions of any single VLIW processor.

In order to enable dynamic re-allocation of a process compiled and executed on a first VLIW processor so as to execute it on a second VLIW processor, there is kept, in the system memory, a table which stores the information corresponding to each process in terms (it may amount to a simple order number) which identify the VLIW processor for which it has been compiled, together with an identifier (also in this case it may simply be a number) which identifies the last VLIW processor on which, within the plurality of processors comprising the multi-processor architecture, the process has been executed, as well as the co-ordinates for tracing the context of the process in the main memory.

"Context of a processor" is here meant to indicate basically:
  the value of the program counter;
  the contents of the register file; and
  the data stack memory.

Using the solution according to the invention it is possible to achieve a considerable simplification in terms of programming environment and requirements of memory and power absorption. Furthermore, the solution according to the invention solves a major problem in the framework of VLIW processors, namely, that of binary compatibility between architectures and different parallelisms, enabling for example the dynamic transfer of the process workload between VLIW processors that are symmetrical from the point of view of the instruction set and asymmetrical in terms of parallelism of instruction.

BRIEF DESCRIPTION OF THE DRAWINGS

The invention will be now be described, purely by way of non-limiting example, with reference to the attached drawings, in which:

FIGS. 1 to 5, which regard the prior art, have already been described previously;

FIGS. 7 and 8 illustrate in greater detail the criteria for handling processes in the framework of an architecture operating according to the invention;

DETAILED DESCRIPTION OF THE INVENTION

Figure 6:
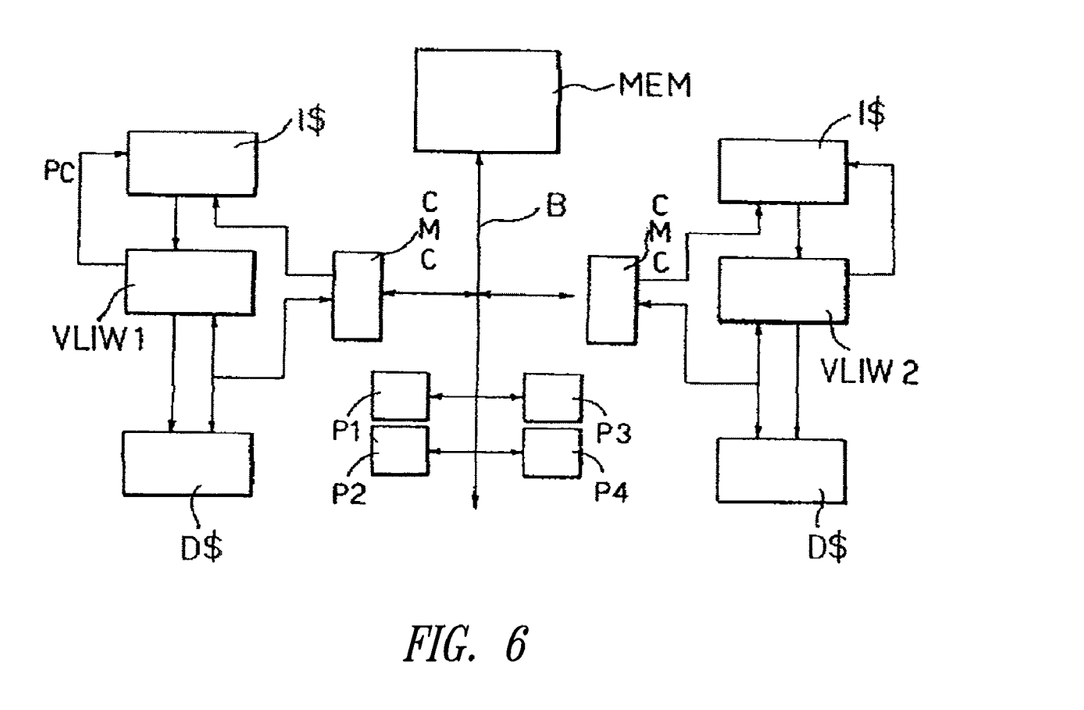
FIG. 6 illustrates, in the form of a block diagram, the architecture of a multiprocessor system that is able to operate according to the invention.

From the block diagram of FIG. 6, it may be realized that the said diagram essentially reproduces the general set-up of the diagram of FIG. 1, already considered previously.

Unlike the architecture represented in FIG. 1 (which is an intrinsically asymmetrical one, on account of the presence of the two processors CPU 1 and DSP, with different characteristics), the diagram of FIG. 6 is intrinsically symmetrical, in so far as it envisages the presence of two (or more) processors of a VLIW type, here designated, respectively, as VLIW 1 and VLIW 2, which, albeit instantiated according to different criteria, operate in conditions of substantial symmetry, in so far they are able to execute the same processes, without this requiring recompiling or duplication of the object codes for the two processors, it being at the same time altogether possible to allow for the presence of two (or more) VLIW processors having different hardware parallelisms.

In particular, with reference to FIGS. 7 and 8, consider, in a first step, compiling the source code of a process referred to as Task1 corresponding to the operating system, to be executed on the processor VLIW 1 (see the diagram of FIG. 6) and with the corresponding compiler. It will be likewise assumed that at most the said processor can execute in parallel four instructions for each clock cycle.

Moreover, consider, in the self-same step, compiling the source code of a process referred to as Task2, regarding for example the audio/video/graphic multimedia application, to be executed (refer again to the diagram of FIG. 6) on the processor VLIW 2, and with the corresponding compiler. It will likewise be assumed that at the most the processor VLIW 2 can execute eight instructions in parallel for each clock cycle.

Of course, the aforesaid values (four and eight, respectively) and the fact of referring to—two—VLIW processors correspond purely to requirements set by way of example, without any intention of limiting the scope of the invention.

It is moreover to be recalled that the two processors VLIW have the same instruction-set architecture (ISA). This means that they are defined by the same list of instructions, syntax and semantics, and length (for example 32 bits per basic instruction).

FIG. 8 shows how the aim is to associate statically and dynamically each of the processes indifferently on each of the two processors VLIW 1 and VLIW 2 on the basis of decisions that can change dynamically. These may, for example, be decisions based upon the dynamic load of each of the processors, upon the dynamic operating frequency, and upon instantaneous energy consumption, the final purpose being to split the workload evenly on the two processors.

Again, it is to be noted that each of the two (or more) processors considered is able to function with a different working frequency, so that each processor may dynamically change the operating frequency without jeopardizing its proper operation.

For example, the Task1, as shown in FIG. 7, is compiled for generating a flow of long instructions with a maximum length of four, assuming that they are to be executed on the processor VLIW 1.

The Task2 is, instead, compiled for generating a flow of long instructions with a maximum length of eight, assuming that the intention is to execute them on the processor VLIW 2.

Again by way of example, it is assumed that the intention is to reverse the association defined above, with the aim of associating the Task2 to the processor VLIW 1 and the Task1 to the processor VLIW 2.

Figure 9:
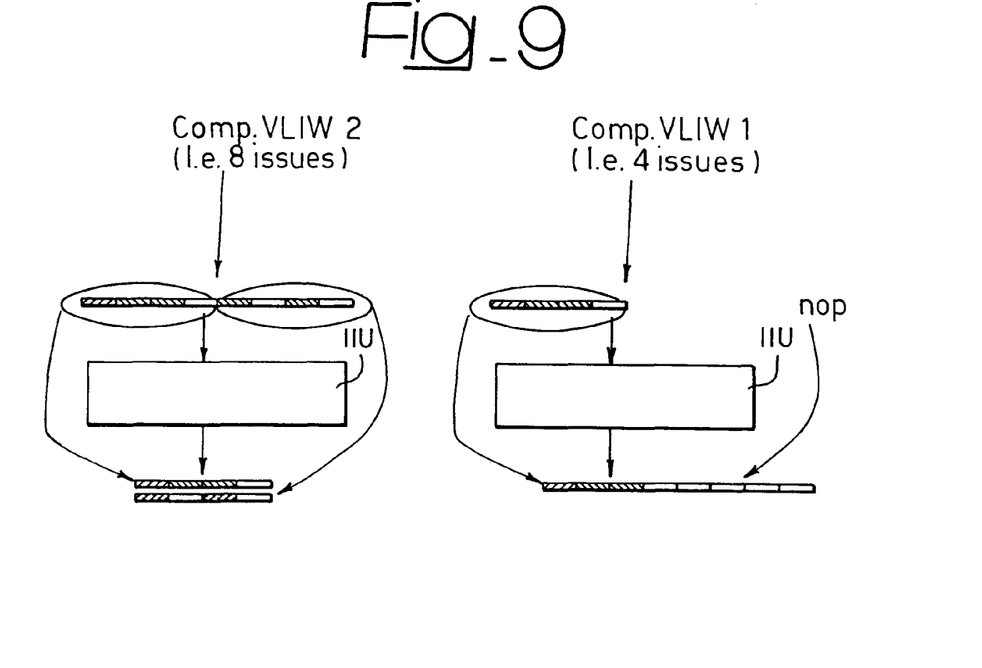
FIG. 9 illustrates the criteria of organization of a unit for issuing instructions implemented according to the invention.

FIG. 9 shows how the so-called instruction-issue unit (IIU) of a processor, as noted in FIG. 3, has to be modified for carrying out the following task with the purpose of ensuring binary compatibility without duplicating the object code.

Assume that the IIU proposed by the processor VLIW 1 receives instructions that are 8×32 bits long whereas the processor is able to execute at the most 4×32 bits per cycle.

The IIU will thus have to split the instructions at input into two instructions that are 4×32 bits long.

Now assume that the IIU of the processor VLIW 2 receives instructions that are 4×32 bits long, whereas the processor is able to execute at the most 8×32 bits per cycle.

The IIU in question must thus lengthen the input instruction by means of 4×32 bit null instructions of the no-operation (nop) type.

A typical example (well known to persons skilled in the sector) of a nop instruction is the instruction for carrying out the addition of the number 0 with itself to be written in the register that contains the said 0, which is one just for reading. It is therefore an instruction that expresses a deliberate nonsense. Furthermore, the nop instructions cause switching-off of four of the eight functional units, so reducing the power consumption of the processor VLIW 2.

The examples considered above can evidently be generalized in the following way:

1. Consider L1 to be the maximum length of the long instruction of which the processor VLIW 1 enables execution: for example, VLIW 1 can execute up to 3 instructions in parallel, each 32 bits long.

2. Consider L2 to be the maximum length of the long instruction of which the processor VLIW 2 enables execution: for example, VLIW 2 can execute up to 3 instructions in parallel, each 32 bits long.

3. Let L1>=L2.

4. Let A=L1/L2 be the integer result of the division between L1 and L2. For simplicity, assume that the said result is equal to four.

5. Let B be the integer remainder of the operation L1/L2, a remainder which is evidently smaller than of L2. It may be assumed, for example that the said remainder is equal to 1.

6. The intention is to execute an instruction of length L1 on the processor VLIW 2.

Consequently:

if B is equal to zero, the length L1 is broken down into A long instructions L2;

if B is other than zero, L1 is broken down into A long instructions L2, to which there is to be added a further long instruction L2, made up of the remaining instructions of L1 not used for composing the previous A long instructions L2, corresponding to B instructions of the set L1, by further adding L2-B nop instructions.

7. The aim is to execute an instruction of length L2 on the processor VLIW 1; hence to the instruction L2 there must be added L1-L2 nop instructions.

It will be appreciated that the same criteria apply if L2>L1, it being sufficient to change the index 1 with the index 2 without jeopardizing the generality of the method.

FIG. 9 illustrates a further example of what has been said above, an example which relates specifically to the case where L1 is equal to 4 and L2 is equal to 8.

Figure 10:
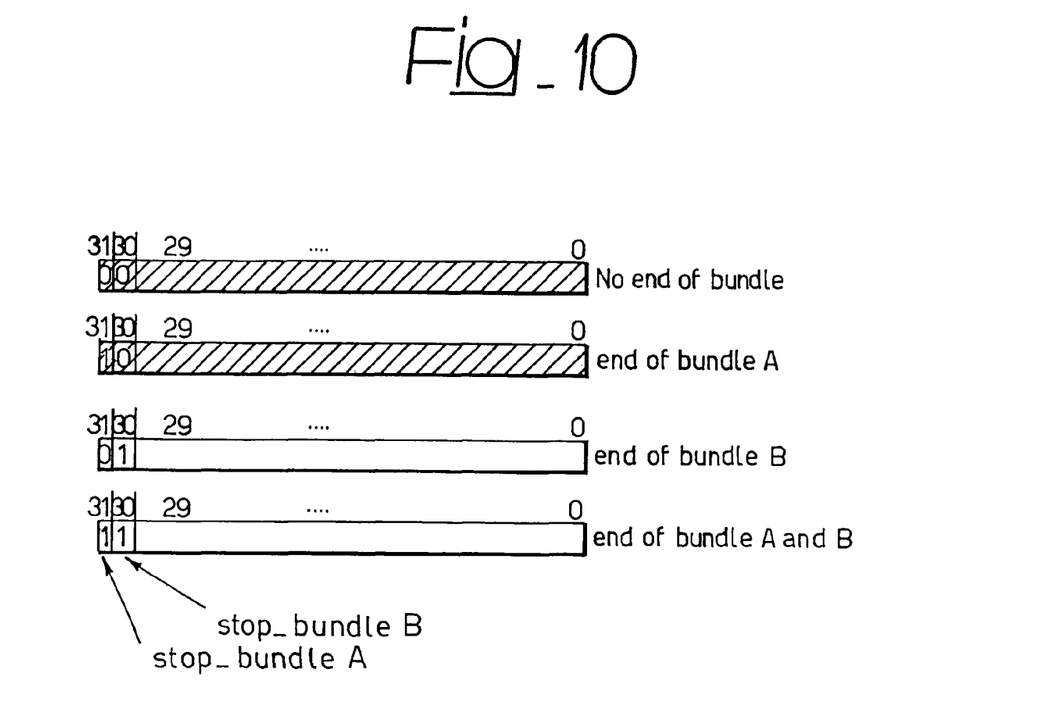
FIGS. 10 to 12 illustrate details of implementation of various interventions on sets of instructions in the framework of a system operating according to the invention, also in relation to the position in which the formatting of the instructions is carried out.
Figure 11:
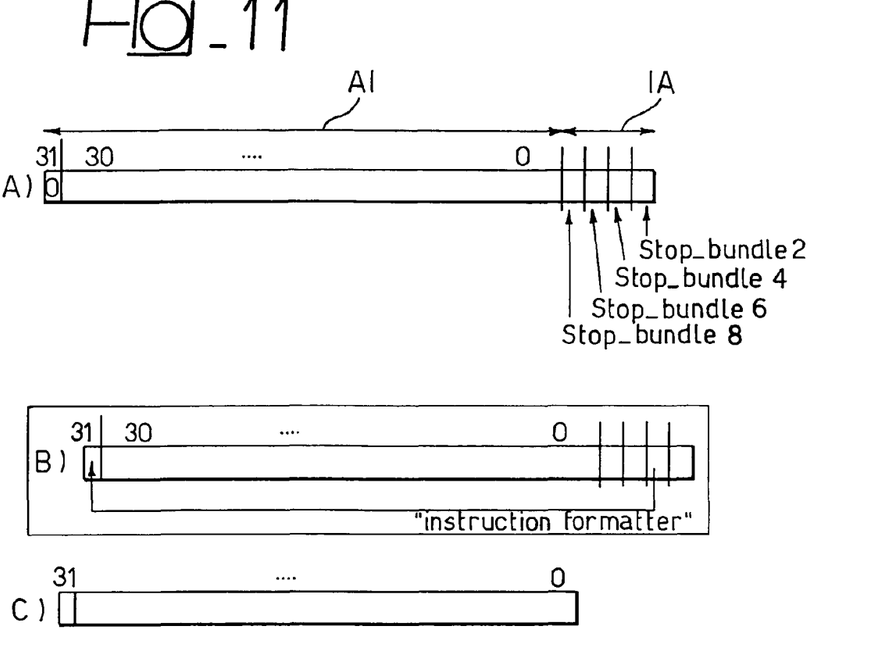

Another solution, which refers specifically to FIGS. 10 and 11, may consist in rendering explicit, in the machine instructions of the processor, different bits referred to as "stop-bundle" bits corresponding to different word lengths, i.e., different maximum levels of parallelism executable by the machine.

In the case of FIG. 10, a processor built with parallelism A uses as stop-bundle indicator the bit 31, ignoring the bit 30. Instead, a processor built with parallelism B uses as stop-bundle indicator the bit 30, ignoring the bit 31. The verification of the end of bundle is made normally at the level of instruction-issue unit (IIU), since each processor has an associated instruction cache I$ and (potentially) a compressor/decompressor of the code to be executed. The solution illustrated in FIG. 10 may be generalized as described in what follows.

Given a generic instruction set with instructions encoded on N bits (for example, let N=32), assume moreover that one of said bits encodes the stop-bundle instruction for the processor. To these words are added K bits, which encode the stop-bundle information for different lengths of word. For example, if K=4 the 4 bits in question encode the stop-bundle information for lengths of 2, 4, 6, and 8, respectively.

In the decoding step, i.e., in the cache re-fill step, or else in the code-decompression step, the operation of placing the appropriate stop bundle in the "effective" instruction bit can be carried out according to the parallelism of the machine which is executing the code. In this connection see FIG. 11.

In particular, in said figure there may be noted, in the top part designated by A, a situation in which the bit 31 has not envisaged entry of a stop-bundle information datum, this as regards the bit 31 of the portion of the instruction, designated by AI, in which the instruction proper is entered. In the instruction appendix, designated by IA, there are instead entered the stop-bundle information data, and in particular for output widths of 2 (SB2), 4 (SB4), 6 (SB6) and 8 (SB8), respectively.

The situation represented in Part B of FIG. 11 refers instead to execution on a machine with width 4. In the said situation, the stop bundle for the width of 4 is placed in the instruction corresponding to the bit 31. The above comprises the consequent possibility of rejecting the part of appendix IA, so as to give rise to an instruction format represented in Part C again of FIG. 11. The module which performs the operation just described is defined as "instruction-formatting" module or "instruction formatter".

The operation just described may be carried out in different positions in the system. It will again be noted that in FIG. 10 there are represented, proceeding from the top down, the different possible combinations of the bits in positions 30 and 31, designed to function as stop-bundle bits for the output widths B (bit 30) and A (bit 31), i.e., the following four cases:
   absence of end of bundle,
   end of bundle A,
   end of bundle B, and
   end of both bundle A and B.

Figure 12:
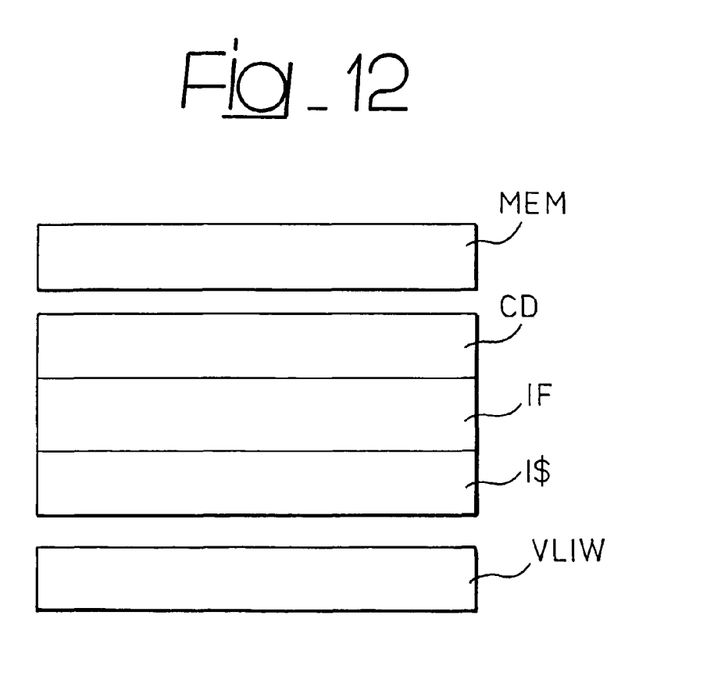

It may be noted from FIG. 12, that it is possible to place the aforesaid formatter, designated by IF, between the possible decompressor of instructions CD and, in any case, between the main memory MM and the instruction cache I$. Alternatively, the formatter IF may be positioned immediately before the VLIW processor and hence after the cache I$ or even in the decoding stage of the VLIW processor. This latter case is the same as the one described previously with reference to FIG. 10 for K=2, N=30.

In the compiling step, then, the compiler generates all the additional (stop-bundle) information for all the output widths envisaged in the instruction appendix IA. The above will then be used by the formatter IF according to the configuration thereof.

The operation performed by the formatter IF consists only in entering a bit and eliminating the appendix IA. These are operations which can be implemented in an elementary way at the hardware level, as will be evident to persons skilled in the sector.

The instructions that make up the task of FIG. 8 are present in the system memory MEM and are addressed by means of the program counter provided in each VLIW processor envisaged (see FIG. 6).

The above instructions are loaded by the fetch unit of FIG. 3 and appropriately adapted to the parallelism of the processor according to the solution implemented by the unit IIU described previously with particular reference to FIG. 9.

The solution according to the invention offers the important advantage provided by the complete binary compatibility between the two (or more) processors, this compatibility being understood as capacity for executing indistinctly said process on the various VLIW processors comprised in a multiprocessor system using the same compiled code without any needless duplications. The said capacity moreover enables dynamic distribution of the computational load on the various processors so as to be able to equalize the operating frequency of the processors themselves with respect to the maximum point. There is thus achieved a saving in dissipated power which, as is known, is linearly dependent upon the operating frequency of the processor.

In order to provide a fuller clarification of how it is possible to shift the execution of a process from one VLIW processor to another, consider the existence of a table stored in the memory MEM of the system.

Figure 13:
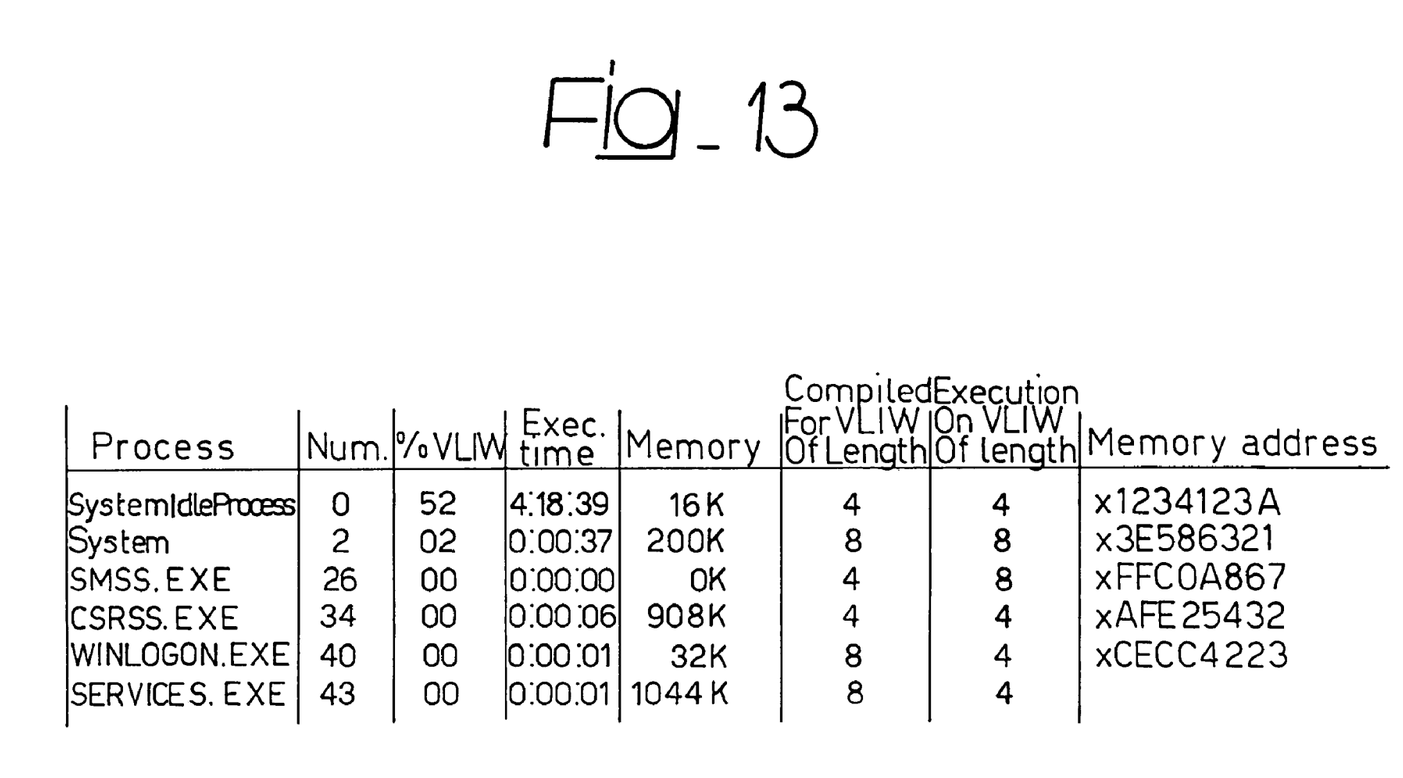
FIG. 13 illustrates the structure of a table that is can be implemented in the framework of the invention.

With reference to FIG. 13, from left to right, the table shows:
a list of processes (Process) that are being executed or are suspended on any single processor;
the progressive number (Num) thereof on the basis of the order of activation;
the percentage (% VLIW) of maximum power of the processor that is used for said process;
the execution time (Exec.time) which, if zero, designates that the process is temporarily suspended from being executed;
the amount of memory (Memory) of the system used by the process to be able to execute the function for which it is responsible;
the maximum length (Compiled For VLIW Of Length) of the long instruction which the VLIW processor can execute and for which it had been generated during compiling;
maximum length (Execution On VLIW Of Length) of the long instruction of the VLIW processor on which it is executed; and
the address of the portion of memory (Memory address) in which the data and the instructions are stored, in other words the context.

The above table is accessible by a process referred to as control process, which is executed for a pre-set time on each of the VLIW processors. By means of the said process, each processor has thus the possibility of consulting and updating the table in order to equalize its own workload with respect to the second processor. The said table likewise contains the co-ordinates whereby a processor can take possession of and execute one of the processes listed.

The solution described may evidently be extended to any number of VLIW processors which make up the system and each of which may have any maximum length whatsoever of the long instruction to be executed, where said length may vary from one processor to another.

Figure 14:
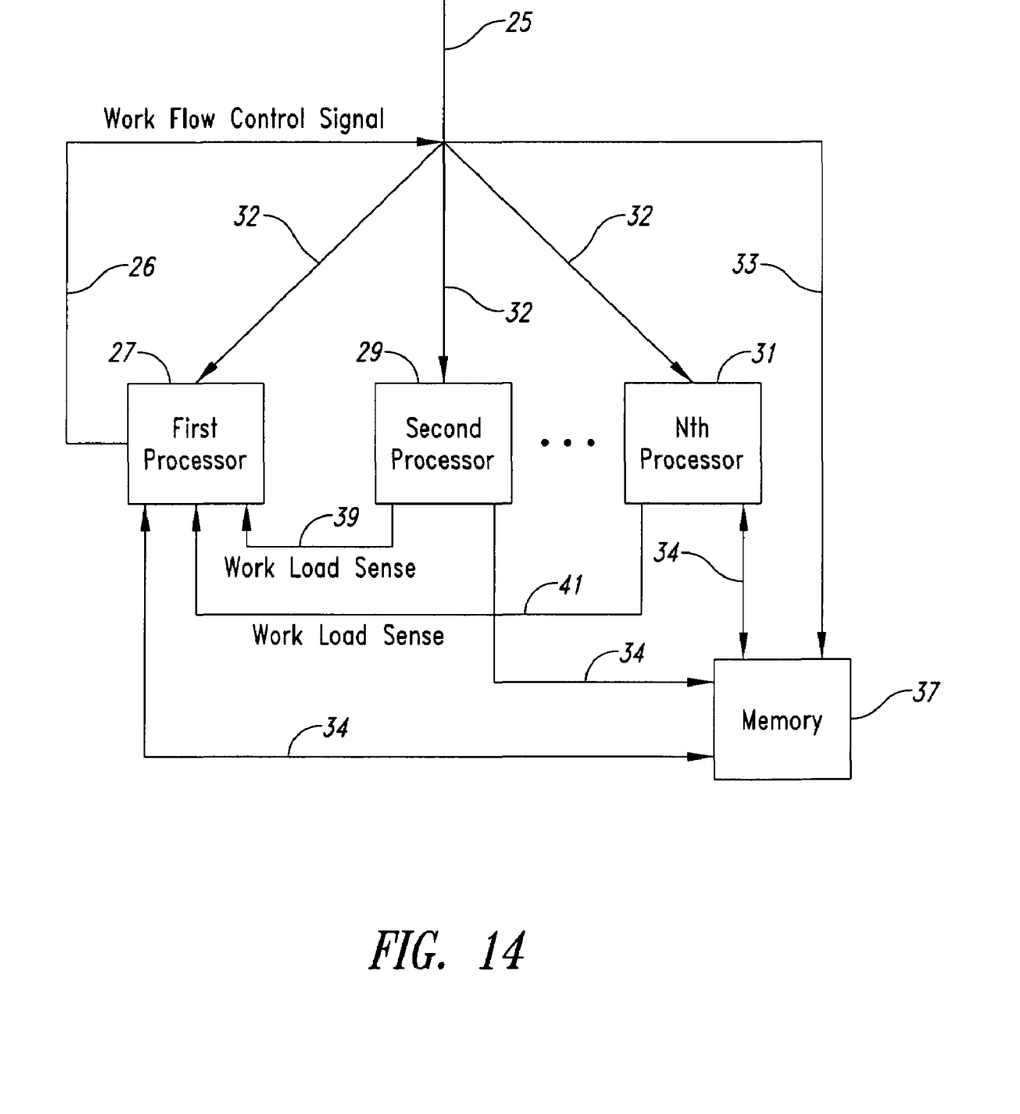
FIG. 14 illustrates an alternative embodiment of one system according to the present invention.

FIG. 14 is a further alternative embodiment of one system according to the present invention. The system of FIG. 14 includes an instruction bus 25, which contains a plurality of instructions to be carried out by the system. The system also includes a first processor 27, a second processor 29, and a third processor 31. Appropriate connection is made via the instruction bus 25 to the first, second and third processors in order to provide instruction sets to them. Such connections can be made by software, hardware or other appropriate connection lines.

A memory 37 is also connected via the appropriate connection line 33 to the bus 25 for storing instructions, storing data and being available to each of the processors 27, 29, 31 through appropriate connection lines 34 for exchanging data and instructions with each of the processors.

It will be appreciated that each of the processors have their own onboard memory, such as cache memory, instruction set memory, or registers as appropriate. They use either the local memory within the processor or the main memory 37 shared by each of the processors.

The first processor 27 receives an indication of the amount of work being performed by the second processor via a workload sense line 39 from the second processor 29 to the first processor 27. The first processor 27 also receives an indication of the amount of work being performed by the third processor via a workload sense line 41 from the third processor 31 to the first processor 27.

The workload sense lines 39 and 41 can sense various characteristics of the workload of each of the processors. For example, they may sense the power consumption of the processors, the number of operations carried out, the amount of memory exchanges or memory usage of the processors, the number of interruptions, and other characteristics, which are indicative of the work actually being performed by the respective processors.

The first processor 27 is, therefore, able to receive data from each of the processors in order to determine the level of work performed by each of them.

In one embodiment, the workload capacity of each of the processors in the plurality is stored for access by the first processor. For example, the second processor 29 may be a medium-sized processor having a medium rated power consumption and a certain rated speed of operation. The third processor 31, or additional nth processors 31 within the set, may have different power capacities and different operating speeds. For example, the third processor 31 may have a much larger power usage capability and a much higher capacity for processing information, executing instruction sets, interacting with memory and other characteristics. According to the alternative embodiment, the first processor 27 will compare the workload of each of the processors with the work capacity of each of the processors. Then, the first processor 27 will direct the instruction sets to the processors based on the available capacity of the respective processors. Thus, in one embodiment, for example, the power consumption of the both of the processors may be the same, but one of the processors may have a much higher power rating so that one of the processors is working at near its maximum rated power while the other processor is working at much lower than of its rated power. In such an instance, the work flow would be shifted from the processor operating at its maximum power to the other processor so as to increase its power consumption and the number of instruction sets being carried out so it is operating closer to its rated capacity.

In this alternative embodiment, the rated capacity is stored in a first memory which the first processor 27 can access, either onboard or within the memory 37, and then the processor's operational characteristics are compared to its rated capacity and the workload is increased or decreased for that particular processor depending on whether it is operating at its peak rated capacity or substantially less than its peak, respectively. If it is operating at its maximum capacity in all respects, it would be anticipated that the processor is unable to process more instruction and therefore the instruction set flow to that processor will be reduced and shifted to other processors in the set. Conversely, if it is operating at substantially less than its rated capacity, then the work flow to the processor may be increased. In the alternative embodiment, the work flow to a particular processor is modified based on that particular processor's capacity to perform additional work rather than an absolute value of the work being performed as compared to the other processors.

Of course, without prejudice to the principle of the invention, the details of implementation and the embodiments may be amply varied with respect to what is described and illustrated herein, without thereby departing from the scope of the present invention, as defined in the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A process for executing programs on a multiprocessor system having a plurality of processors, having an instruction set architecture, each of the processors being able to execute, at each processing cycle, a respective maximum number of instructions, the process comprising:

retrieving a first set of instructions as compiled instruction words having a first length and executable on a first processor of said plurality;

retrieving a second set of instructions as compiled instruction words having a second length and executable on a second processor of said plurality; and modifying, during runtime of one of the programs, at least some of the instruction words of the first set of instructions by converting them into modified-instruction words executable on the second processor of said plurality, said modification operation comprising:

splitting said instruction words of the first set of instructions into modified-instruction words and managing a context of execution of the modified-instruction words by the second processor, wherein said first set of instructions and said second set of instructions have, respectively, a first and a second maximum length with said first maximum length greater than said second maximum length, the quotient between said first maximum length and said second maximum length having a given value with the possible presence of a remainder and in that the procedure comprises the operations of:

selectively modifying instructions in the first set of instructions by:

splitting said first instruction words into a number of said first modified-instruction words equal to the value of said quotient; and in the presence of said remainder, adding to said first modified-instruction words a further modified-instruction word of length equal to said second maximum length, said second maximum length being obtained by entering into said further first modified-instruction word a set of no-operation instructions.

2. The process according to claim 1, further comprising:
modifying at least some of the instruction words of the second set of instructions into second modified-instruction words executable on said first processor of said plurality.

3. The process according to claim 1, further comprising:
encoding said instructions on a given number of bits, said number of bits having a first bit identifying a length of instruction word executable on a processor of said plurality;

associating to said given number of bits a respective appendix having a set of further bits identifying lengths of instruction words executable on different processors of said plurality;

identifying for each of said instructions a processor of said plurality designed to execute said instruction, said identified processor being able to process for each processing cycle a given length of instruction word; and entering in the position of said first identifier bit a chosen bit between said further bits of said appendix, said chosen bit identifying the length of instruction word that can be executed by said identified processor.

4. The process according to claim 3, further comprising the operation of erasing said respective appendix before execution of the instruction.

5. The process according to claim 3, wherein said chosen bit is entered in the position of said first identifier bit in a step chosen from among:

decoding of the instruction in view of the execution;
re-filling of the cache associated to said identified processor; and
decompression of the instruction in view of the execution.

6. The process according to claim 1, further comprising:
alternatively distributing the execution of instructions for programs between the processors of said plurality, said instructions being directly executable by the processors of said plurality in conditions of binary compatibility.

7. The process according to claim 1, further comprising the operation of selectively distributing the execution of said instructions among the processors of said plurality, distributing dynamically the computational load of said processors.

8. The process according to claim 1, further comprising the operation of selectively distributing the execution of said instructions between said processors of said plurality with the criterion of equalizing the operating frequency of the processors of said plurality.

9. The process according to claim 1, further comprising the operation of performing a control process executed by at least one of the processors of said plurality so as to equalize its own workload with respect to the other processors of said multiprocessor system.

10. The process according to claim 1, further comprising the operation of drawing up a table accessible by said control process, said table having items selected from the group of:
   a list of processes being executed or suspended on any processor of said plurality of processors;
   the progressive number thereof according to the order of activation;
   the percentage of maximum power of the processor that is used by said process;
   the execution time, said time, if zero, indicating that the process is temporarily suspended from being executed;
   the amount of memory of the system used by the process to be able to execute the function for which it is responsible;
   the maximum length of the long instruction that the VLIW processor can execute and for which it had been generated during compiling;
   maximum length of the long instruction of the VLIW processor on which it is executed; and
   the address of the portion of memory in which the data and the instructions are stored.

11. The process according to claim 1, further comprising:
   executing, by the second processor, the modified instruction words.

12. A multiprocessor system comprising:
   a first processor having a given instruction set architecture and configured to execute programs with instruction words of a first length;
   a second processor having the given instruction set architecture and configured to execute programs with instruction words of a second length shorter than the first length; and
   means for converting instruction words of the first length compiled for execution on the first processor into modified instruction words of the second length executable on the second processor, the means for converting being configured to selectively:
      split the instruction words of the first length into a number of modified-instruction words equal to a quotient between the first length and the second length; and
      in a presence of a remainder, add to the modified instruction words a further modified instruction word of a length equal to the second length by adding to the remainder a set of no-operation instructions.

13. The multiprocessor system according to claim 12, wherein said processors are all of the Very Long Instruction Word (VLIW) type.

14. The multiprocessor system according to claim 12, wherein said plurality of processors comprises at least one VLIW processor and at least one superscalar processor.

15. The multiprocessor system according to claim 12 wherein said means for converting instruction words of the first length compiled for execution on the first processor into modified instruction words of the second length executable on the second processor is configured to convert the instruction words during runtime.

16. The multiprocessor system of claim 12, further comprising:
   means for selectively controlling execution of the modified instruction words by the second processor.

17. A system comprising:
   a plurality of processors coupled for receiving compiled instruction sets; and
   a first processor of the plurality coupled to each of the other processors within said plurality, said first processor receiving from the other processors data representative of the workload of each of said other processors and configured to generate an output signal from said first processor to said instruction set stream, said output signal controlling the instructions, which are sent to each of said processors based on the results of the workload measurement of said processors, wherein the system is configured to selectively:
      split instruction words of a first length executable on a selected processor in the plurality of processors into a number of modified-instruction words equal to a quotient between the first length and a second length, shorter than the first length, the modified instruction words being executable on another processor in the plurality of processors; and
      in a presence of a remainder, add to the modified instruction words a further modified instruction word of a length equal to the second length by adding to the remainder a set of no-operation instructions.

18. The system according to claim 17, wherein said workload measurement comprises power consumption of each of said processors of said plurality.

19. The system according to claim 17, wherein said workload measurement comprises memory usage of each of said processors of said plurality.

20. The system according to claim 17, wherein said workload measurement comprises number of operations carried out by each of said processors of said plurality.

21. The system of claim 17 wherein the first processor is configured to manage a context of program execution for each of the processors in the plurality of processors and each of the processors is a very-large-instruction-word processor.

22. The system of claim 21 wherein managing a context of program execution includes tracking addresses in a memory in which data and instructions are stored.

23. A process of directing instruction sets to be executed by a plurality of processors in a system comprising:
   receiving a plurality of executable instruction sets on a bus line connected to said processors;
   receiving workload data at a first processor of said plurality of processors, said workload data being representative of workload of each of the processors of said plurality;
   comparing the workload of each of the processors;
   sending a signal from said first processor based on the data representative of the workload of each of the processors of said plurality to the bus line for modifying the number of executable instruction sets sent to each processor based on their respective workloads; and
   selectively,
      splitting instruction words of a first length executable on a selected processor in the plurality of processors into a number of modified-instruction words equal to a quotient between the first length and a second length, shorter than the first length, the modified instruction words being executable on another processor in the plurality of processors; and in a presence of a remainder, adding to the modified instruction words a further modified instruction word of a length equal to the second length by adding to the remainder a set of no-operation instructions.

24. The process according to claim 23, wherein said workload data includes data regarding power consumption of each of said processors of said plurality.

25. The system according to claim 23, wherein said workload data includes data regarding memory usage of each of said processors of said plurality.

26. The system according to claim 23, wherein said workload data includes data regarding the number of operations carried out by each of said processors of said plurality.

27. The process of claim 23, further comprising:

managing a context of program execution for each of the processors in the plurality of processors.

28. The process of claim 23, further comprising:

modifying a set of compiled instructions sent to a processor in the plurality of processors by splitting instruction words in the set of compiled instructions into modified instruction words, wherein each of the plurality of processors is of a very-long-instruction-word type.

29. The process of claim 23, further comprising:

modifying a set of compiled instructions sent to a processor in the plurality of processors by adding no-operation instruction words to the instruction words in the set of compiled instructions.

* * * * *

UNITED STATES PATENT AND TRADEMARK OFFICE
CERTIFICATE OF CORRECTION

| | |
|---|---|
| PATENT NO. | : 7,395,532 B2 |
| APPLICATION NO. | : 10/612831 |
| DATED | : July 1, 2008 |
| INVENTOR(S) | : Antonio Maria Borneo et al. |

It is certified that error appears in the above-identified patent and that said Letters Patent is hereby corrected as shown below:

<u>Column 14</u>
Line 19, "processor to said instruction set stream" should read as -- processor to an instruction set stream --

Line 42, "load measurement comprises number of operations" should read as -- load measurement comprises a number of operations --

Signed and Sealed this

Twenty-first Day of October, 2008

JON W. DUDAS
*Director of the United States Patent and Trademark Office*